J. P. James,
Grab Hook,
N° 32,872. Patented July 23, 1861.

Witnesses
J. Coombs
Geo. Reed

Inventor
Jos. P. James
per Munn & Co
Attorneys

UNITED STATES PATENT OFFICE.

JOSEPH P. JAMES, OF PEPIN, MINNESOTA.

GRAB OR SELF-CLOSING HOOK.

Specification of Letters Patent No. 32,872, dated July 23, 1861.

*To all whom it may concern:*

Be it known that I, JOSEPH P. JAMES, of Pepin, in the county of Wabasha and State of Minnesota, have invented a new and Improved Grab-Hook; and I do hereby declare that the following is a full, clear, and exact description of the same, reference being had to the accompanying drawing, forming part of this specification, in which—

Figure 1:
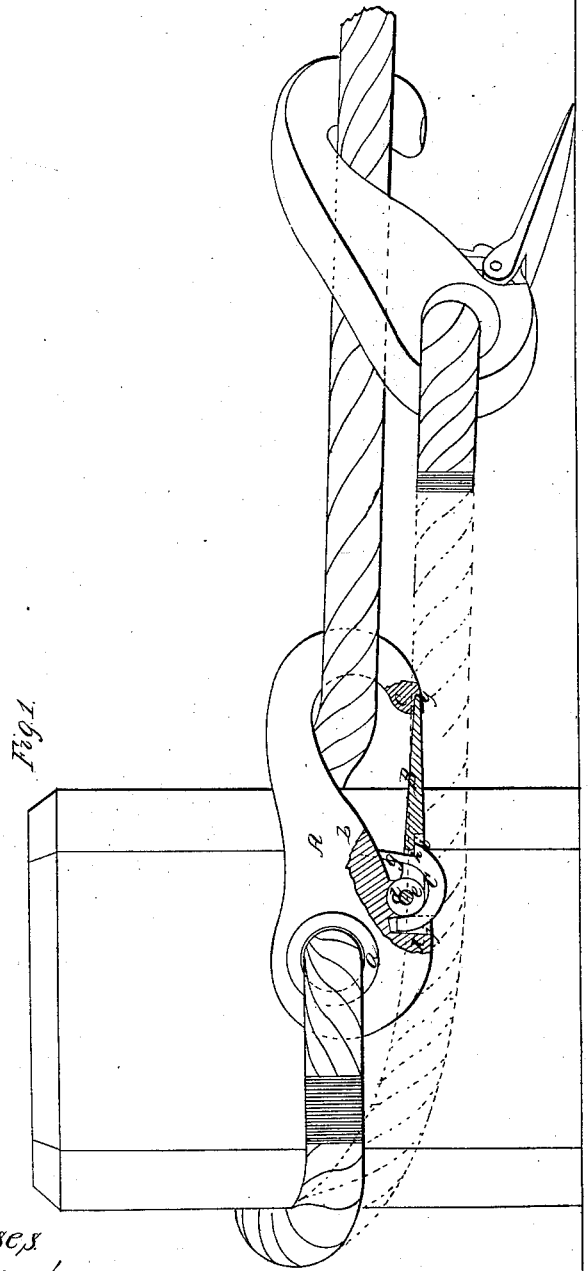
Figure 2:
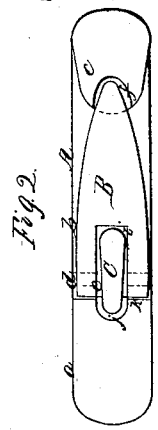

Figure 1 represents a sectional side elevation of my invention. Fig. 2, is a front elevation of ditto.

Similar letters of reference indicate corresponding parts in both figures.

This invention consists in the arrangement of a spring catch in combination with a latch which is hinged to the shank of the hook and which closes down upon its point from the outside in such a manner, that when the latch is opened by forcing back the spring catch, a line or rope may be readily introduced into, or taken out of the hook and that the latch is closed automatically by coming in contact with a stone or other resisting body, and when closed it is firmly retained by the catch.

To enable those skilled in the art to make and use my invention, I will proceed to describe its construction and operation with reference to the drawing.

The hook A, is made with an eye $a$, at the end of its shank $b$, and with a point $c$, in the ordinary form. A latch B, is hinged to the shank of the hook by means of a pivot $d$, passing through the butt-end of said latch and through a lug $e$, which projects from the shank as clearly shown in Fig. 1, of the drawing. This latch closes down upon the point of the hook, which is provided with a small recess $f$, to receive the point of the latch and when closed said latch is retained in its position by a spring catch C, that is firmly attached to the shank of the hook. The stem $g$, of this catch forms the spring and its body is curved backward and provided with a nose $h$, which catches over the inner edge of a slot $i$, in the latch and retains the same in its position when closed. The point of the spring catch turns down into a cavity $j$, in the shank which forms the guide for the same and prevents the spring catch being thrown back any farther than necessary to relieve the latch. A shoulder $k$, formed either by the shank of the hook or by the rear end of the body of the spring catch holds the latch when the same is thrown open and prevents the same being opened any farther than desirable.

This hook is particularly intended to facilitate the operation of checking a raft or boat, and to reduce the cost of the line used for this purpose. The end of the line is fastened in the eye of the hook and if it is desired to check a raft or boat, the line is carried around a post or tree and the hook is hooked on the line, the latch being thrown open as clearly shown in red outlines in Fig. 1 of the drawing. As the line is tightened, the hook slides up close to the post and during this motion, if the latch comes in contact with a stone or other resisting body, it will close down automatically or it may be closed by slightly tapping it with the hand, and by the time the line is pulled tight, the hook assumes the position shown in Fig. 1 of the drawing in black outlines. The hook instead of being fastened by means of the rope may be hooked into a ring or other suitable device capable of retaining the raft or boat. If it is desired to release the line, the latch is turned back and it (the line) can now be removed without difficulty, while at the same time the spring catch has sufficient power to prevent the latch opening spontaneously and to release the line prematurely.

The principal advantage of my hook over grab hooks of the ordinary construction is derived from the fact, that the latch of my hook opens outwardly far enough to admit of introducing or removing the line quite freely, whereas the latches of ordinary grab hooks either open inwardly whereby the removal of the line is rendered very difficult or if said latches open outwardly, the distance between the point of the hook and the latch, when fully opened, is so small that it is very difficult to get the line in or out. And at the same time my hook retains the line perfectly secure, for if the line is tight, it never comes in contact with the latch and if the line is slack, the spring catch will sustain the latch even if a portion of the rope should rest upon it.

Having thus fully described my invention, what I claim as new and desire to secure by Letters Patent, is—

The arrangement of the spring catch C, in combination with the outwardly opening hinged latch B, and hook A, all constructed and operating in the manner and for the purpose shown and described.

JOSEPH P. JAMES.

Witnesses:
S. N. KNIGHT,
J. A. SHUGLEY.